United States Patent
Laporte

(10) Patent No.: US 11,956,034 B2
(45) Date of Patent: Apr. 9, 2024

(54) COEFFICIENT SOLUTION FOR LOW PEAK-TO-AVERAGE POWER RATIO (PAPR) PRECODERS

(71) Applicant: Telefonaktiebolaget LM Ericsson (publ), Stockholm (SE)

(72) Inventor: Pierre-Andre Laporte, Gatineau (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 221 days.

(21) Appl. No.: 17/603,457

(22) PCT Filed: May 1, 2019

(86) PCT No.: PCT/IB2019/053567
§ 371 (c)(1),
(2) Date: Oct. 13, 2021

(87) PCT Pub. No.: WO2020/222034
PCT Pub. Date: Nov. 5, 2020

(65) Prior Publication Data
US 2022/0182112 A1 Jun. 9, 2022

(51) Int. Cl.
*H04B 7/0456* (2017.01)
*H04L 27/26* (2006.01)

(52) U.S. Cl.
CPC ....... *H04B 7/0456* (2013.01); *H04L 27/2614* (2013.01)

(58) Field of Classification Search
CPC ... H04B 1/04; H04B 7/04; H04B 7/06; H04B 7/0413; H04B 7/0452; H04B 7/0456; H04L 5/00; H04L 12/24; H04L 12/815; H04L 25/03; H04L 27/20; H04L 27/26; H04L 27/2614
USPC ........ 370/252, 254, 329; 375/219, 260, 267, 375/295, 316
See application file for complete search history.

(56) References Cited

U.S. PATENT DOCUMENTS 10,305,636 B1 * 5/2019 Shattil .................. H04L 1/0681

FOREIGN PATENT DOCUMENTS

| CN | 107438957 A | 12/2017 |
| CN | 108886389 A | 11/2018 |
| WO | 2018/147775 A1 | 8/2018 |
| WO | 2019/069117 A1 | 4/2019 |

OTHER PUBLICATIONS

International Search Report and Written Opinion dated Dec. 10, 2019 issued in PCT Application No. PCT/IB2019/053567, consisting of 14 pages.
Christopher Studer et al., "Democratic Representations" CORR abs/1401.3420, Cornell University Library, Apr. 22, 2015, consisting of 43 pages.

(Continued)

*Primary Examiner* — Shawkat M Ali
(74) *Attorney, Agent, or Firm* — Sage Patent Group

(57) ABSTRACT

A network node is provided. The network node includes processing circuitry configured to determine at least one Convex Reduction of Amplitude, CRAM, projection matrix based at least in part on a signal subspace of scheduled wireless devices, and optionally cause transmission based at least in part on the at least one CRAM projection matrix.

32 Claims, 11 Drawing Sheets

```
BEGIN
   ↓
Determine at least one Convex Reduction of Amplitude, CRAM,
projection matrix based at least in part on a signal subspace of
scheduled wireless devices
S134
   ↓
Optionally cause transmission based at least in part on the at
least one CRAM projection matrix
S136
   ↓
END
```

(56) References Cited

OTHER PUBLICATIONS

Bao et al., Perturbation-Assisted PAPR Reduction for Large-Scale MIMO-OFDM Systems via ADMM, Cornell University Library, Jul. 10, 2016, consisting of 10 pages.
Bin Yang, Projection Approximation Subspace Tracking, IEEE Transactions on Signal Processing, vol. 43, No. 1, Jan. 1995, consisting of 13 pages.
First Office Action dated Dec. 7, 2023 for Chinese Patent Application No. 201980096014.9, 10 pages (includes English translation).

* cited by examiner

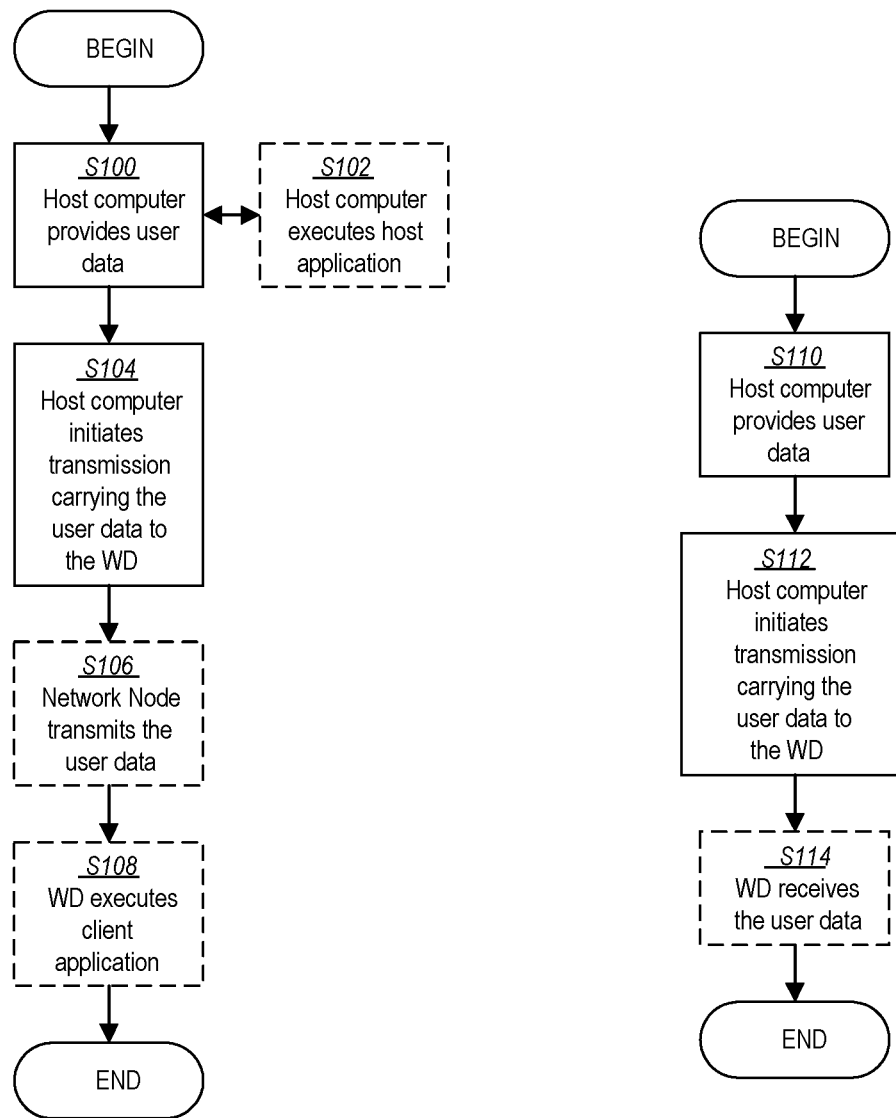

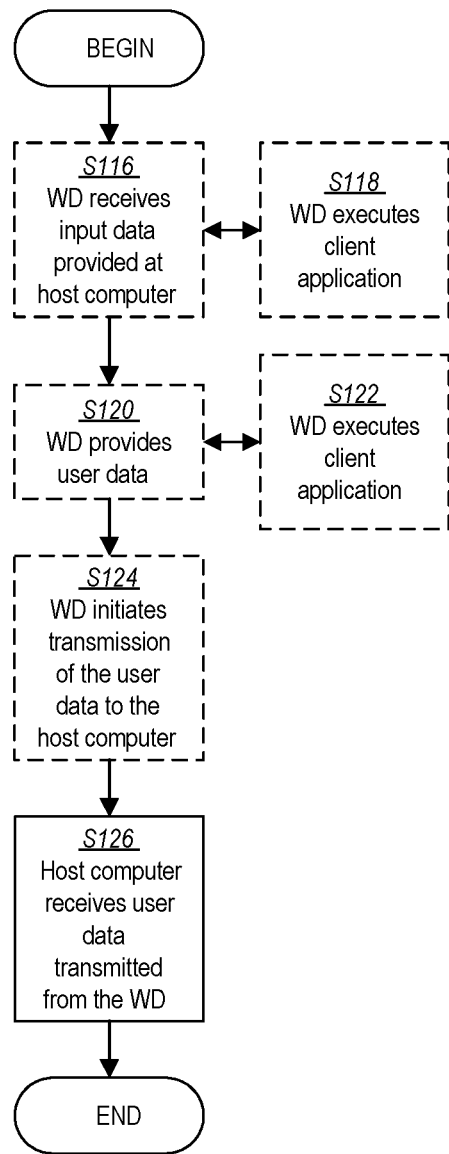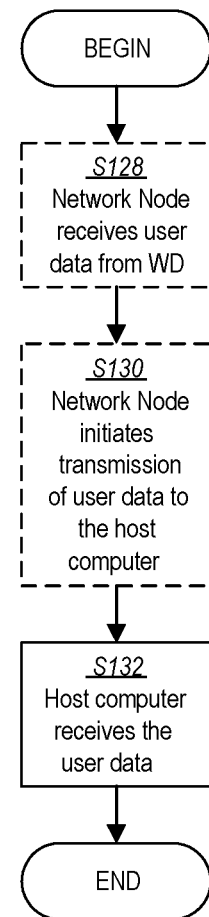
FIG. 6
FIG. 7

COEFFICIENT SOLUTION FOR LOW PEAK-TO-AVERAGE POWER RATIO (PAPR) PRECODERS

CROSS-REFERENCE TO RELATED APPLICATIONS

This application is a Submission Under 35 U.S.C. § 371 for U.S. National Stage Patent Application of International Application Number: PCT/IB2019/053567, filed May 1, 2019 entitled "COEFFICIENT SOLUTION FOR LOW PEAK-TO-AVERAGE POWER RATIO (PAPR) PRECODERS," the entirety of which is incorporated herein by reference.

TECHNICAL FIELD

Wireless communication and in particular, to using a signal subspace to at least in part generate projection matrices for wireless transmission.

BACKGROUND

Fifth generation (5G, also referred to as New Radio (NR)) wireless systems introduce massive-Multiple-Input Multiple-Output (MIMO) technology to further improve the spectral efficiency of mobile communication networks. Network node architectures may be fundamentally impacted as the number of antenna may increase approximately by one order of magnitude together with the associated number of transmitter and receiver chains. This paradigm shift may introduce complexity challenges to the design of network radio products, where the size and the power consumption may dramatically increase if conventional design approaches are followed. In turn, these attributes may be in demand by network operators.

Low peak-to-average power ratio (PAPR) precoding algorithms offer a solution to this complexity problem by reducing the dynamic range of the Orthogonal Frequency-Division Multiplexing (OFDM) signals to levels that are unattainable using traditional Crest Factor Reduction (CFR) techniques. For example, downlink waveforms in conventional cellular systems may typically be associated with a first PAPR range where low PAPR precoders are able to reduce the PAPR range below this first PAPR range. Low PAPR may be achieved by taking advantage of the large number of degrees of freedom that are available in Massive-MIMO systems. The low PAPR that is obtained using these techniques enables several radio optimizations such as the elimination of traditional CFR, the elimination or the reduced complexity of the Digital Pre-Distortion (DPD) algorithms, the efficient use of smaller and less power-demanding Power Amplifiers (PA's), the use of smaller cooling sub-systems, the potential utilization of lower resolution data converters, etc.

SUMMARY

Some embodiments advantageously provide a method, wireless device and network node for using a signal subspace to at least in part generate projection matrices for wireless transmission. According to one aspect of the disclosure, a network node includes processing circuitry configured to determine at least one Convex Reduction of Amplitude, CRAM, projection matrix based at least in part on a signal subspace of scheduled wireless devices, and optionally cause transmission based at least in part on the at least one CRAM projection matrix.

According to one or more embodiments of this aspect, the at least one CRAM projection matrix is based at least in part on a signal subspace of interfering wireless devices. According to one or more embodiments of this aspect, the at least one CRAM projection matrix is based at least in part on at least one precoding codebook entry. According to one or more embodiments of this aspect, the processing circuitry is further configured to determine the signal subspace of scheduled wireless devices based at least in part by tracking at least one uplink channel.

According to one or more embodiments of this aspect, the processing circuitry is further configured to determine the signal subspace of scheduled wireless devices based at least in part by tracking a pre-coded signal from a precoder. According to one or more embodiments of this aspect, the processing circuitry is further configured to receive an indication of the signal subspace of the scheduled wireless devices in a pre-coded signal from a precoder. According to one or more embodiments of this aspect, the processing circuitry is further configured to receive indications of the signal subspace of the scheduled wireless devices from the scheduled wireless devices.

According to one or more embodiments of this aspect, the signal subspace of the scheduled wireless devices corresponds to eigenvectors associated with the channel response of the scheduled wireless devices. According to one or more embodiments of this aspect, the signal subspace of the scheduled wireless devices is an M×K signal subspace where M is a quantity of antennas of the network node and K is a quantity of Multiple-Input Multiple-Output, MIMO, layers. According to one or more embodiments of this aspect, the processing circuitry is further configured to determine Multiple-Input Multiple-Output, MIMO, precoders based at least in part on the at least one CRAM projection matrix where the transmission is based at least in part on the MIMO precoders.

According to another aspect of the disclosure, a method implemented in a network node is provided. At least one Convex Reduction of Amplitude, CRAM, projection matrix is determined based at least in part on a signal subspace of scheduled wireless devices. Transmission is caused based at least in part on the at least one CRAM projection matrix. According to one or more embodiments of this aspect, the at least one CRAM projection matrix is based at least in part on a signal subspace of interfering wireless devices. According to one or more embodiments of this aspect, the at least one CRAM projection matrix is based at least in part on at least one precoding codebook entry.

According to one or more embodiments of this aspect, the signal subspace of scheduled wireless devices is determined based at least in part by tracking at least one uplink channel. According to one or more embodiments of this aspect, the signal subspace of scheduled wireless devices is determined based at least in part by tracking a pre-coded signal from a precoder. According to one or more embodiments of this aspect, an indication of the signal subspace of the scheduled wireless devices is received in a pre-coded signal from a precoder.

According to one or more embodiments of this aspect, indications of the signal subspace of the scheduled wireless devices are received from the scheduled wireless devices. According to one or more embodiments of this aspect, the signal subspace of the scheduled wireless devices corresponds to eigenvectors associated with the channel response of the scheduled wireless devices. According to one or more embodiments of this aspect, the signal subspace of the scheduled wireless devices is an M×K signal subspace where M is a quantity of antennas of the network node and K is a quantity of Multiple-Input Multiple-Output, MIMO, layers. According to one or more embodiments of this aspect, Multiple-Input Multiple-Output, MIMO, precoders are determined based at least in part on the at least one CRAM projection matrix where the transmission is based at least in part on the MIMO precoders.

According to another aspect of the disclosure, a wireless device includes processing circuitry configured to provide assistance information associated with a signal subspace of the wireless device, and receive transmission based at least in part on at least one CRAM projection matrix. The at least one CRAM projection matrix is based at least in part on a signal subspace of scheduled wireless devices including the signal subspace associated with the assistance information.

According to one or more embodiments of this aspect, the at least one CRAM projection matrix is based at least in part on a signal subspace of interfering wireless devices. According to one or more embodiments of this aspect, the at least one CRAM projection matrix is based at least in part on at least one precoding codebook entry. According to one or more embodiments of this aspect, the signal subspace of the scheduled wireless devices corresponds to eigenvectors associated with the channel response of the scheduled wireless devices.

According to one or more embodiments of this aspect, the signal subspace of the scheduled wireless devices is an M×K signal subspace where M is a quantity of antennas of the network node and K is a quantity of Multiple-Input Multiple-Output, MIMO, layers. According to one or more embodiments of this aspect, the transmission is based at least in part on Multiple-Input Multiple-Output, MIMO, precoders, the MIMO precoders being based at least in part on the at least one CRAM projection matrix.

According to another aspect of the disclosure, a method implemented in a wireless device is provided. Assistance information associated with a signal subspace of the wireless device is provided. Transmission based at least in part on at least one CRAM projection matrix is received where the at least one CRAM projection matrix is based at least in part on a signal subspace of scheduled wireless devices includes the signal subspace associated with the assistance information.

According to one or more embodiments of this aspect, the at least one CRAM projection matrix is based at least in part on a signal subspace of interfering wireless devices. According to one or more embodiments of this aspect, the at least one CRAM projection matrix is based at least in part on at least one precoding codebook entry. According to one or more embodiments of this aspect, the signal subspace of the scheduled wireless devices corresponds to eigenvectors associated with the channel response of the scheduled wireless devices.

According to one or more embodiments of this aspect, the signal subspace of the scheduled wireless devices is an M×K signal subspace where M is a quantity of antennas of the network node and K is a quantity of Multiple-Input Multiple-Output, MIMO, layers. According to one or more embodiments of this aspect, the transmission is based at least in part on Multiple-Input Multiple-Output, MIMO, precoders where the MIMO precoders are based at least in part on the at least one CRAM projection matrix.

According to another aspect of the disclosure, a network node includes processing circuitry configured to determine a plurality of Convex Reduction of Amplitude, CRAM, projection matrices based at least in part on a signal subspace of scheduled wireless devices. The processing circuitry is further configured to determine a plurality of low peak-to-average power ratio (PAPR) precoders for Multiple-Input Multiple-Output, MIMO, transmission based at least in part on the plurality of CRAM projection matrices, and cause transmission based at least in part on the low PAPR precoders.

According to one or more embodiments of this aspect, the plurality of CRAM projection matrices are based at least in part on a signal subspace of interfering wireless devices. According to one or more embodiments of this aspect, the signal subspace of the scheduled wireless devices corresponds to eigenvectors associated with the channel response of the scheduled wireless devices. According to one or more embodiments of this aspect, the signal subspace of the scheduled wireless devices is an M×K signal subspace where M is a quantity of antennas of the network node and K is a quantity of MIMO layers.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a flowchart illustrating exemplary methods implemented in a communication system including a host computer, a network node and a wireless device for executing a client application at a wireless device according to some embodiments of the present disclosure;

FIG. 5 is a flowchart illustrating exemplary methods implemented in a communication system including a host computer, a network node and a wireless device for receiving user data at a wireless device according to some embodiments of the present disclosure;

FIG. 6 is a flowchart illustrating exemplary methods implemented in a communication system including a host computer, a network node and a wireless device for receiving user data from the wireless device at a host computer according to some embodiments of the present disclosure;

FIG. 7 is a flowchart illustrating exemplary methods implemented in a communication system including a host computer, a network node and a wireless device for receiving user data at a host computer according to some embodiments of the present disclosure;

DETAILED DESCRIPTION

One example of low PAPR precoding approach is called Convex Reduction of Amplitudes (CRAM). This method has been introduced by Christoph Studer et al. in the paper "Democratic Representations," CORR abs/1401.3420, page 43 (hereinafer referred to as reference [1], the entirety of which is herein incorporated by reference). Although the CRAM approach offers a low computational cost, reference [1] only describes a single-carrier system with Zero-Forcing (ZF) precoding.

To support many of the practical constraints that are encountered in real-world systems, the CRAM framework was extended by Mark Rollins et al. in PCT Application IB2017/056155 entitled "Practical Low-PAPR Precoding System for Massive MIMO" (hereinafter referred to as reference [2], the entirety of which is herein incorporated by reference) to support the following features:
  Global vs. per-antenna clipping.
  Port reduction.
  Reciprocity-Assisted Interference Aware Transmission (RAIT) to reduce inter-cell interference.
  Multi-carrier and multi-band configurations.
  Incomplete channel knowledge.

Figure 1:
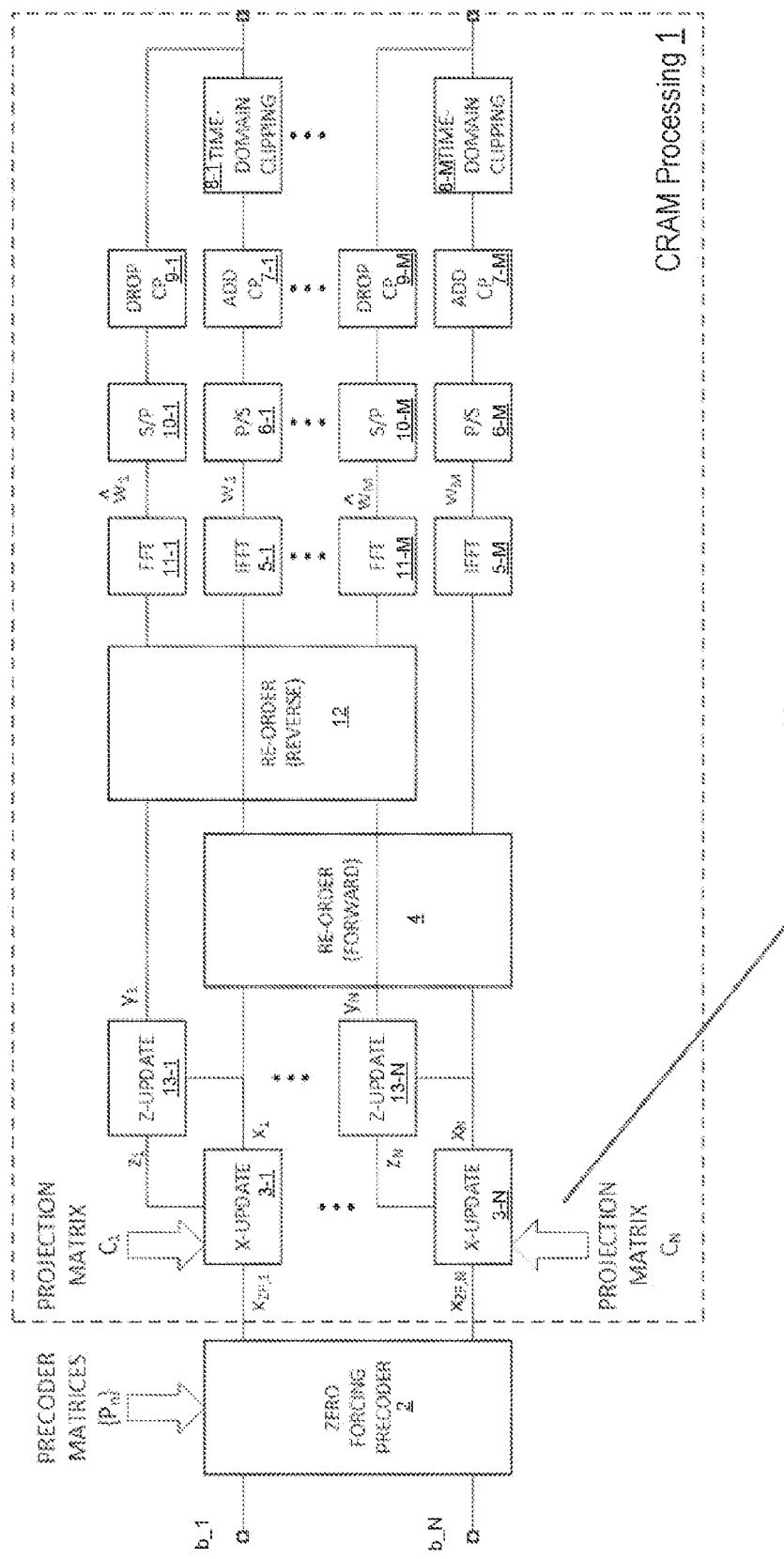
FIG. 1 is a block diagram of an example of CRAM processing.

One example of the CRAM approach from reference [2] is illustrated in FIG. 1 for an OFDM system with N subcarriers and M antennas. The CRAM processing engine 1 includes a ZF precoder 2 which receives a number (N) of frequency-domain input signals $b_n \in \mathbb{C}^{k \times 1}$ for $n=1, \ldots, N$. The frequency-domain input signals $b_n$ are also referred to herein as layer-domain input vectors. For example, for a 20 MHz LTE signal, N=1200 and K is typically in the range of, e.g., 2 to 8. The ZF precoder 2 is a linear precoder that performs digital beamforming individually on each frequency-domain input signal $b_n$ using a respective ZF precoding matrix $P_n$ to produce a respective frequency-domain precoded signal $x_{ZF,n} \in \mathbb{C}^{M \times 1}$ for $n=1, \ldots, N$. One or more X-update functions 3-1 to 3-N input the precoded signals $x_{ZF,n}$, frequency-domain Z-update output signals $z_n \in \mathbb{C}^{M \times 1}$ for $n=1, \ldots, N$ from Z-update functions 13-1 to 13-M and projection matrices $C_1$-$C_N$ input via the CRAM coefficient interface, and produce the frequency-domain X-update output signals $x_n \in \mathbb{C}^{M \times 1}$ for $n=1, \ldots, N$. In the forward direction, the frequency-domain X-update outputs $x_n$ for $n=1, \ldots, N$ are provided to a re-ordering function 4 that re-orders the N frequency-domain X-update vectors $x_n$ each containing M samples into a new set of M vectors $a_m$ each containing N frequency-domain samples. The re-ordered vectors $a_m$ for $m=1, \ldots, M$ are converted from the frequency-domain to the time-domain via respective IFFTs 5-1 through 5-M to provide the time-domain signals $w_m$ for $m=1, \ldots, M$ for the M antenna branches, respectively. Time-domain processing is then performed on the M time-domain signals $w_m$. In this example, the time-domain processing includes Parallel-to-Serial (P/S) conversion by P/S converters 6-1 through 6-M and prepending Cyclic Prefixes (CPs) via ADD CP functions 7-1 through 7-M, respectively. Time-domain clipping functions 8-1 through 8-M perform time-domain clipping of the M time-domain transmit signals for the M antenna branches. In the reverse direction, the M clipped time-domain transmit signals are fed back through respective CP removal DROP CP functions 9-1 through 9-M and respective Serial-to-Parallel (S/P) converters 10-1 through 10-M to provide the M time-domain feedback signals for the M antenna branches, respectively, which correspond to the time-domain clipped signals $\hat{w}_m$ for $m=1, \ldots, M$. The M time-domain feedback signals are converted from the time-domain to the frequency-domain via respective FFTs 11-1 through 11-M. A re-ordering function 12 performs a reverse re-ordering of the frequency-domain feedback signals to provide the N frequency-domain feedback signals $y_n$ for the N subcarriers, respectively. The N frequency-domain feedback signals $x_n$ and $y_n$ are provided to respective Z-update functions 13-1 through 13-N, which perform a frequency-domain Z-update procedure in accordance with the prior art.

However, the CRAM framework from the prior art is not without issues. Some projection matrices $C_n \in \mathbb{C}^{M \times M}$ where n is the subcarrier index and M is the number of antennas, may be needed in this CRAM framework to help ensure that the spatial constraints are met in the X-update portion of the algorithm. These projection matrices are defined as:

$$C_n = I - P_n^{ZF} H_n \qquad (1)$$

Where:
  I is the M×M identity matrix.
  $H_n \in \mathbb{C}^{K \times M}$ is the channel matrix for subcarrier n, where K is the number of MIMO layers.
  $p_n^{ZF} \in \mathbb{C}^{M \times K}$ is the zero-forcing precoding matrix for subcarrier n and is expressed as:

$$P_n^{ZF} = H_n^\dagger H_n^H (H_n H_n^H)^{-1} \qquad (2)$$

It is assumed that the projection matrices $C_n$ are computed outside of the CRAM processing engine. For example, the computation of the projection matrices may be collocated to the channel estimation function, and the CRAM processing engine could be physically located elsewhere within the network node 16 such as in another ASIC or FPGA chip for instance. Therefore, an interface may be needed to carry the projection matrices to the CRAM engine as illustrated in FIG. 1. This interface is referred to as CRAM coefficient interface.

Assume a radio system with the following specifications:
  6×20 MHz LTE carriers.
  One CRAM projection matrix per Physical Resource Block (PRB).
  100 PRB per 20 MHz LTE carrier.
  64 antennas.
  8 MIMO layers.
  12-bit quantization for both the real and the imaginary parts of the CRAM projection coefficients.
  An LTE OFDM symbol rate of 15 KHz.

Each projection matrix is Hermitian symmetric and of size M×M. The Hermitian symmetry allows for the transmission of only approximately half of the matrix entries over the CRAM coefficient interface. The number of matrix entries (i.e., coefficients) N to be transferred for each PRB is defined as:

$$N = \frac{M^2 + M}{2} \quad (3)$$

The throughput requirement of the CRAM coefficient interface for a system with the above characteristics would be as follows:

$$T_1 = 6 \text{ carriers} \times 100 \frac{PRB}{\text{carrier}} \times \frac{(64^2 \times 64)}{2} \frac{coeffs}{PRB} \times$$
$$24 \frac{bits}{coeff} \times 15 \times 10^3 \text{ Hz}$$
$$= 449.28 \text{ Gbps}$$

For example, assuming that this interface would be implemented using Serializer-Deserializer (SERDES) lanes at 16 Gbps each, twenty-nine data links would be required to fulfill this throughput requirement of communicating the CRAM coefficients over the CRAM coefficient interface. This may have a negative impact on the complexity and the power consumption of both the baseband and the radio units.

The disclosure advantageously helps solve at least a portion of the problems described above by providing taking advantage of a signal subspace to address the CRAM coefficient interface bandwidth challenge by reducing the throughput requirement of the CRAM coefficient interface. In one or more embodiments, the coefficient interface is eliminated altogether.

Before describing in detail exemplary embodiments, it is noted that the embodiments reside primarily in combinations of apparatus components and processing steps related to using a signal subspace to at least in part generate projection matrices for wireless transmission. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

It may in particular be considered that control signaling as described herein, based on the utilized resource sequence, implicitly indicates the control signaling type. Transmitting in downlink may pertain to transmission from the network or network node to the wireless device. Transmitting in uplink may pertain to transmission from the wireless device to the network or network node. Transmitting in sidelink may pertain to (direct) transmission from one wireless device to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for using a signal subspace to at least in part generate and/or determine projection matrices for wireless transmission.

Figure 2:
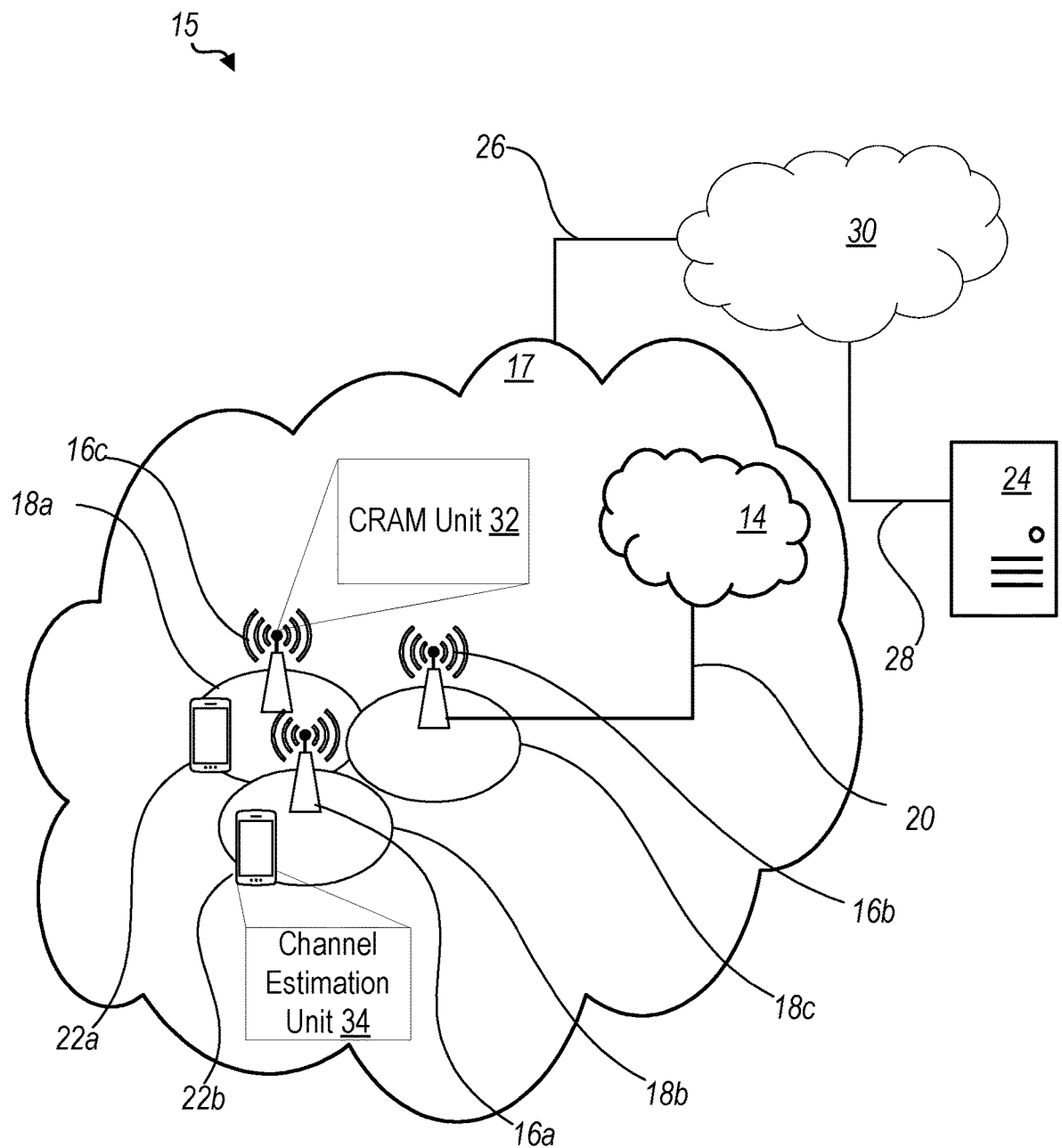
FIG. 2 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 2 a schematic diagram of a communication system 15, according to an embodiment, such as a 3GPP-type cellular network that may support standards such as LTE and/or NR (5G), which comprises an access network 17, such as a radio access network, and a core network 14. The access network 17 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 15 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 15 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 17, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a Convex Reduction of Amplitude, CRAM, unit 32 which is configured to perform one or more functions described herein such as with respect to using a signal subspace to at least in part generate projection matrices for wireless transmission. Example implementations, in accordance with an embodiment, of the WD 22, network node 16 and host computer 24 discussed in the preceding paragraphs will now be described with reference to FIG. 3. In a communication system 15, a host computer 24 comprises hardware (HW) 38 including a communication interface 40 configured to set up and maintain a wired or wireless connection with an interface of a different communication device of the communication system 15. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to one or more of provide, forward, relay, determine, receive, transmit, communicate, store, etc. information related to using a signal subspace to at least in part generate projection matrices for wireless transmission.

The communication system 15 further includes a network node 16 provided in a communication system 15 and including hardware 58 enabling it to communicate with the host computer 24 and with the WD 22. The hardware 58 may include a communication interface 60 for setting up and maintaining a wired or wireless connection with an interface of a different communication device of the communication system 15, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 15 and/or through one or more intermediate networks 30 outside the communication system 15.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include CRAM unit 32 configured to perform one or more network node functions as described herein such as with respect to using a signal subspace to at least in part generate projection matrices for wireless transmission.

The communication system 15 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a channel estimation unit 34 configured to perform one or more wireless device functions described herein such as with respect to the projection matrices used for wireless transmission.

Figure 3:
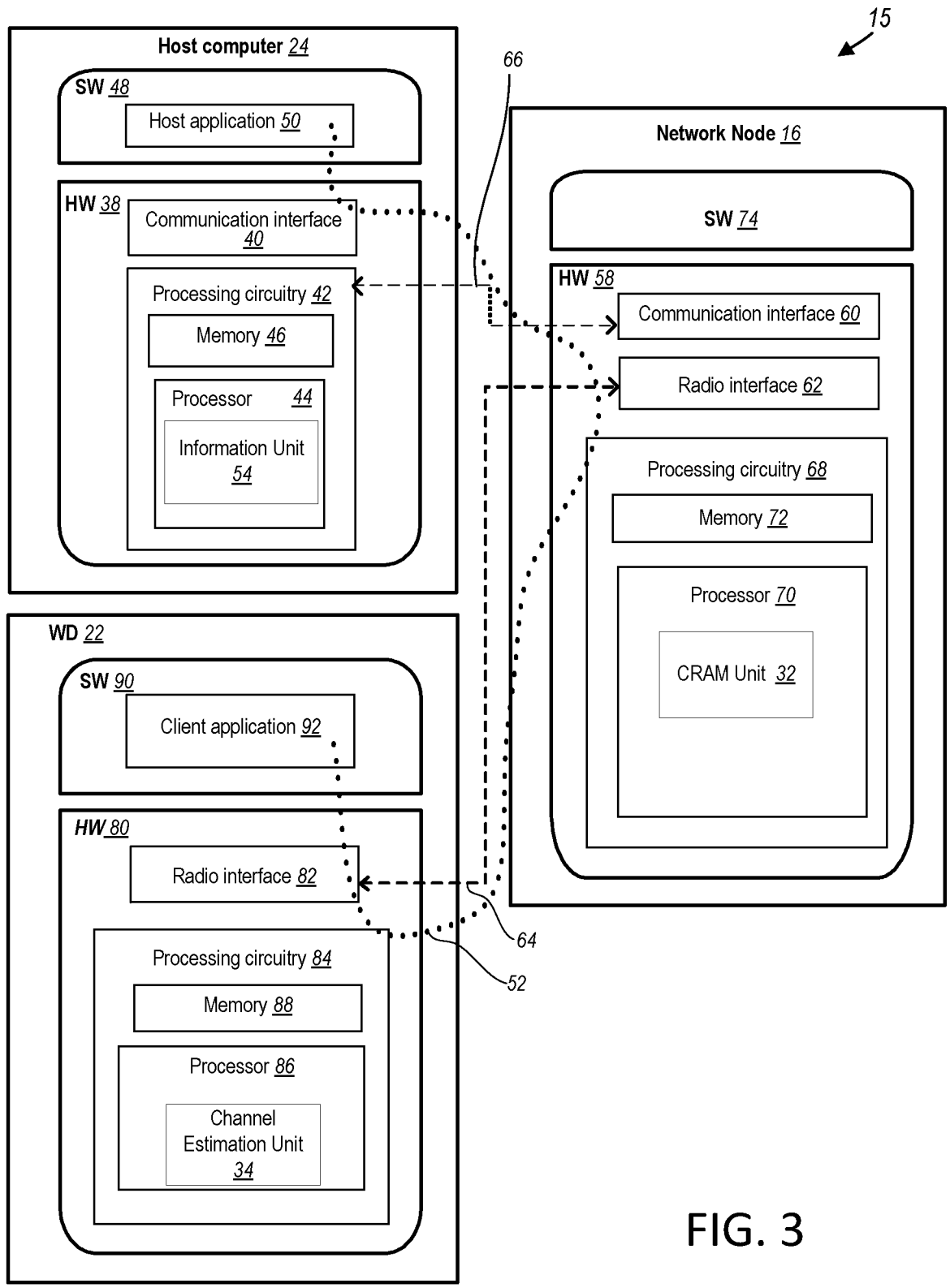
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as CRAM unit 32, and channel estimation unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
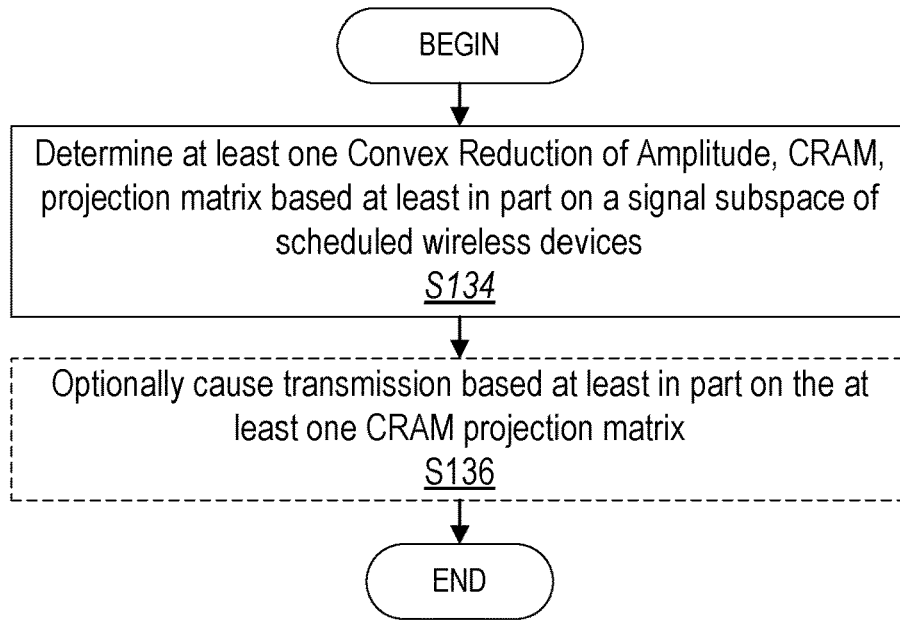
FIG. 8 is a flowchart of an exemplary process in a network node in accordance with one or more embodiments of the disclosure.

FIG. 8 is a flowchart of an exemplary process in a network node 16 according to one or more embodiments of the disclosure. One or more Blocks and/or functions performed by network node 16 may be performed by one or more elements of network node 16 such as by CRAM unit 32 in processing circuitry 68, processor 70, radio interface 62, etc. In one or more embodiments, network node 16 such as via one or more of processing circuitry 68, processor 70, communication interface 60 and radio interface 62 is configured to determine (Block S134) at least one Convex Reduction of Amplitude, CRAM, projection matrix based at least in part on a signal subspace of scheduled wireless devices 22, as described herein. In one or more embodiments, wireless device such as via one or more of processing circuitry 84, processor 86 and radio interface 82 is configured to optionally cause (Block S136) transmission based at least in part on the at least one CRAM projection matrix, as described herein.

According to one or more embodiments, the at least one CRAM projection matrix is based at least in part on a signal subspace of interfering wireless devices 22. According to one or more embodiments, the at least one CRAM projection matrix is based at least in part on at least one precoding codebook entry. According to one or more embodiments, the processing circuitry 68 is further configured to determine the signal subspace of scheduled wireless devices 22 based at least in part by tracking at least one uplink channel.

According to one or more embodiments, the processing circuitry 68 is further configured to determine the signal subspace of scheduled wireless devices 22 based at least in part by tracking a pre-coded signal from a precoder 2. According to one or more embodiments, the processing circuitry 68 is further configured to receive an indication of the signal subspace of the scheduled wireless devices 22 in a pre-coded signal from a precoder 2. According to one or more embodiments, the processing circuitry 68 is further configured to receive indications of the signal subspace of the scheduled wireless devices 22 from the scheduled wireless devices 22.

According to one or more embodiments, the signal subspace of the scheduled wireless devices 22 corresponds to eigenvectors associated with the channel response of the scheduled wireless devices 22. According to one or more embodiments, the signal subspace of the scheduled wireless devices 22 is an M×K signal subspace where M is a quantity of antennas of the network node 16 and K is a quantity of Multiple-Input Multiple-Output, MIMO, layers. According to one or more embodiments, the processing circuitry 68 is further configured to determine Multiple-Input Multiple-Output, MIMO, precoders based at least in part on the at least one CRAM projection matrix, the transmission being based at least in part on the MIMO precoders.

Figure 9:
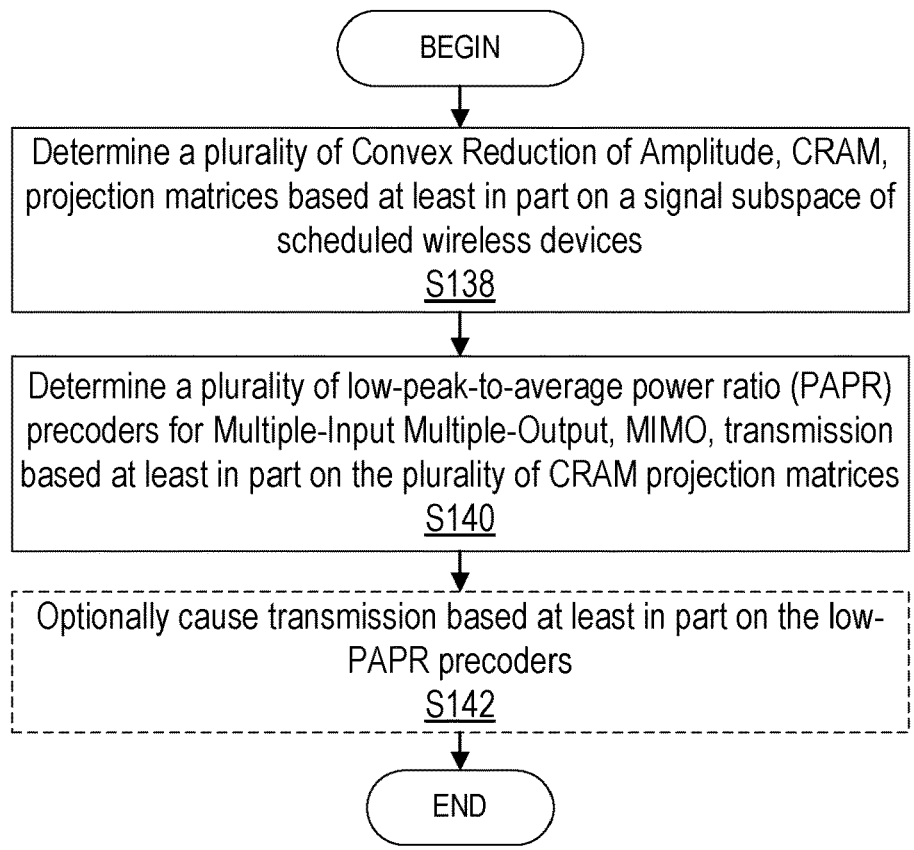
FIG. 9 is a flowchart of another exemplary process in a network node in accordance with one or more embodiments of the disclosure.

FIG. 9 is a flowchart of another exemplary process in a network node 16 according to one or more embodiments of the disclosure. One or more Blocks and/or functions performed by network node 16 may be performed by one or more elements of network node 16 such as by CRAM unit 32 in processing circuitry 68, processor 70, radio interface 62, etc. In one or more embodiments, network node 16 such as via one or more of processing circuitry 68, processor 70, communication interface 60 and radio interface 62 is configured to determine (Block S138) a plurality of Convex Reduction of Amplitude, CRAM, projection matrices based at least in part on a signal subspace of scheduled wireless devices 22, as described herein. In one or more embodiments, network node 16 such as via one or more of processing circuitry 68, processor 70, communication interface 60 and radio interface 62 is configured to determine (Block S140) a plurality of low-peak-to-average power ratio (PAPR) precoders for Multiple-Input Multiple-Output, MIMO, transmission based at least in part on the plurality of CRAM projection matrices. In one or more embodiments, network node 16 such as via one or more of processing circuitry 68, processor 70, communication interface 60 and radio interface 62 is configured to optionally cause (Block S142) transmission based at least in part on the low-PAPR precoders.

According to one or more embodiments, the plurality of CRAM projection matrices are based at least in part on a signal subspace of interfering wireless devices 22. According to one or more embodiments, the signal subspace of the scheduled wireless devices 22 corresponds to eigenvectors associated with the channel response of the scheduled wireless devices 22. According to one or more embodiments, the signal subspace of the scheduled wireless devices 22 is an M×K signal subspace where M is a quantity of antennas of the network node 16 and K is a quantity of MIMO layers.

Having generally described arrangements for using a signal subspace to at least in part generate and/or determine projection matrices for wireless transmission, details for these arrangements, functions and processes are provided as follows, and which may be implemented by the network node 16, wireless device 22 and/or host computer 24. Various examples and/or embodiments for determining, via processing circuitry 68, for example, the CRAM projection matrix are described. By substituting equation (2) into (1), the CRAM projection matrix can be re-written as follows:

$$C_n = I - H_n^H (H_n H_n^H)^{-1} H_n \quad (4)$$

In turn, the channel matrix $H_n$ may be expressed in terms of its singular value decomposition (SVD) components:

$$H_n = U_n \cdot \Sigma_n \cdot V_n^H \quad (5)$$

Where:
$U_n \in \mathbb{C}^{K \times K}$ contains the left singular vectors.
$\Sigma_n \in \mathbb{R}^{K \times M}$ is a diagonal matrix containing the singular values.
$V_n \in \mathbb{C}^{M \times M}$ contains the right singular vectors.
Substituting (5) into (4) yields:

$$C_n = I - V_n \cdot \Sigma_n^H \cdot U_n^H (U_n \cdot \Sigma_n \cdot V_n^H \cdot V_n \cdot E_n^H \cdot U_n^H)^{-1} \cdot U_n \cdot \Sigma_n \cdot V_n^H$$

$$C_n = I - V_n \cdot \Sigma_n^H \cdot U_n^H \cdot {}_n (U_n \cdot \Sigma_n \cdot I \cdot \Sigma_n^H \cdot U_n^H)^{-1} \cdot U_n \cdot \Sigma_n \cdot V_n^H$$

$$C_n = I - V_n \cdot \Sigma_n^H \cdot U_n^H \cdot (U_n \cdot \lambda_n \cdot U_n^H)^{-1} \cdot U_n \cdot \Sigma_n \cdot V_n^H$$

$$C_n = I - V_n \cdot \Sigma_n^H \cdot U_n^H \cdot (U_n \cdot \lambda_n^+ \cdot U_n^H) \cdot U_n \cdot E_n \cdot V_n^H$$

$$C_n = I - V_n \cdot \Sigma_n^H \cdot I \cdot \lambda_n^+ \cdot I \cdot \Sigma_n \cdot V_n^H$$

$$C_n = I - V_n \cdot \tilde{I} \cdot V_n^H$$

$$C_n = I - S_n \cdot S_n^H \quad (6)$$

where $I - S_n \cdot S_n^H$ may correspond to eigenvectors of scheduled wireless devices 22, and
Where:
$\lambda_n \in \mathbb{R}^{K \times K}$ is the diagonal matrix of the eigenvalues which corresponds to
$\lambda_n = \Sigma_n \cdot \Sigma_n^H$
$\lambda_n^+ \in \mathbb{R}^{K \times K}$ is the inverse of the diagonal matrix $\lambda_n$ and is expressed as:

$$\lambda_n^+ = \begin{bmatrix} 1/\lambda_{0,n} & 0 & \cdots & 0 \\ 0 & 1/\lambda_{1,n} & \square & \cdots \\ \cdots & \square & \cdots & 0 \\ 0 & \cdots & 0 & 1/\lambda_{K-1,n} \end{bmatrix} \quad (7)$$

$\tilde{I}$ is an incomplete M×M identity matrix with only the first K diagonal entries set to one and the remaining entries set to zero.
$S_n \in \mathbb{C}^{M \times K}$ is the column span of the WD 22 signal in the $V_n$ matrix and it corresponds to the WD 22 eigenvectors, also known as the WD 22 signal subspace. As used herein, signal subspace may refer to the subspace of scheduled wireless devices 22.

Equation (6) demonstrates how the $C_n$ CRAM projection matrices can be directly expressed in terms of the WD 22 eigenvectors, i.e., signal subspace of scheduled wireless devices 22. Therefore, only the M×K signal subspace $S_n$ may need to be transmitted over the CRAM coefficient interface, which may require much less throughput as described herein when compared to existing systems. Since Massive-MIMO systems typically have more antennas than layers, M is usually larger than K (M>>K) and this approach results in a significant throughput reduction of the coefficient interface. In one or more embodiments, the signal subspace may be determined via processing circuitry 68 based at least in part on assistance information provided by one or more wireless devices 22. For example, in one or more embodiments, a wireless device 22 may perform downlink channel estimation using channel estimation unit 34 and provide assistance information to the network node 16 through the radio interface 82 that indicates the wireless device 22's signal subspace and/or channel response and/or some compressed information about the aforementioned downlink channel attributes.

Figure 10:
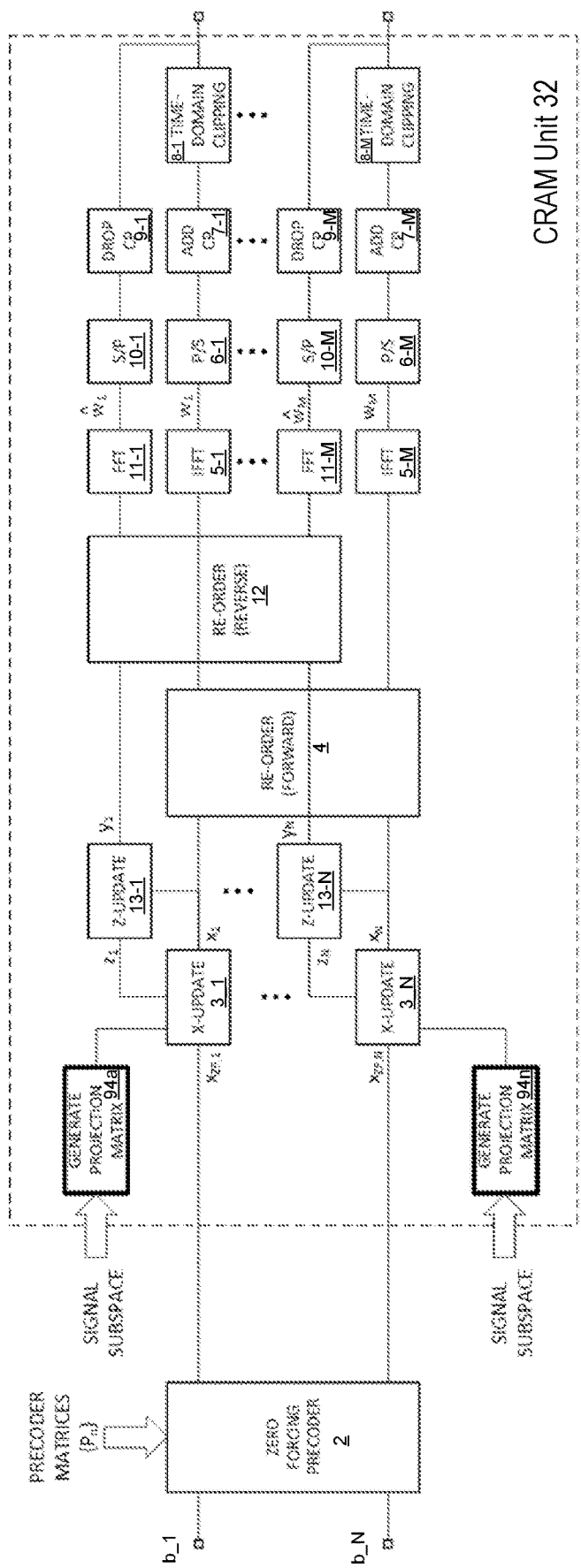
FIG. 10 is a block diagram of one example of a CRAM unit in accordance with one or more embodiments of the disclosure.

The projection coefficients can be generated at a reasonable cost, i.e., less cost than those of existing systems, inside the CRAM unit 32, i.e., CRAM processing engine, that is part of processing circuitry 68 using the last row of equation (6). Due to the Hermitian symmetry of the CRAM projection matrices, only $$\frac{M^2 + M}{2}$$

entries may need to be computed. FIG. 10 illustrates a block diagram of a first example of the disclosure. In particular, like reference designators in FIGS. 1 and 10 represent like functions such that these functions are not described in detail below. As illustrated in FIG. 10, generation of projection matrix functions 94a-94n, as described herein, has been added CRAM processing such that CRAM unit 32 is a function of both signals $s_1$-$s_N$ and the signal subspace of scheduled wireless devices 22. As used herein, the blocks in bold in FIGS. 10-13 illustrate at least one of the functions that is added to generate the projection matrices inside the CRAM unit 32.

This first example provides an interface throughput reduction factor of:

$$T_2^{reduction\_factor} = \frac{\frac{M^2 + M}{2}}{M \cdot K} = \frac{M + 1}{2 \cdot K} \quad (8)$$

when compared to known systems.

In the numerical example of the projection matrices described above, the CRAM coefficient interface throughput requirement using the signal subspace approach would be of:

$$T_2 = 6 \text{ carriers} \times 100 \frac{PRB}{\text{carrier}} \times (64 \times 8) \frac{\text{coeffs}}{PRB} \times$$
$$24 \frac{\text{bits}}{\text{coeff}} \times 15 \times 10^3 \text{ Hz}$$
$$= 110.5920 \text{ Gbps}$$

This is compared to 449.28 Gbps described above. The above throughput requirement of the first example can be fulfilled with seven SERDES lanes at 16 Gbps each. While CRAM unit 32 is illustrated as being in processor 70, CRAM unit 32 may be provided based on hardware and/or software and is not limited solely to implementation in processor 70 only.

Interference Aware Transmissions—Second Example

Reciprocity Assisted Interference Aware Transmissions (RAIT) can be supported by augmenting the signal subspace $S_n$ of the scheduled WD 22's with that of the interfering WD 22's located in adjacent cells $IF_n$ as follows:

$$C_n^{RAIT} = I - [S_n | IF_n] \cdot [S_n | IF_n]^H \quad (9)$$

In a second Example the interferer's subspace $IF_n$ of one or more interfering wireless devices 22 is also transmitted over the interface which results in an interface throughput reduction factor of:

$$T_3^{reduction\_factor} = \frac{\frac{M^2 + M}{2}}{M \cdot (K + I_f)} = \frac{M + 1}{2 \cdot (K + I_f)} \quad (10)$$

Where $I_f$ is the number of interference eigenvectors. Therefore, at least one CRAM projection matrix, i.e., $C_n^{RAIT}$ in this example, is determined by CRAM unit 32 and/or processing circuitry 68 based at least in part on the signal subspaces $S_n$ and $IF_n$ described herein.

Codebook-Based Transmissions—Example 3

In codebook-based transmissions, the CRAM projection matrix is defined as:

$$C_n^{CB} = I - CB_n \cdot CB_n^H \quad (11)$$

Where $CB_n$ is the matrix of the used codebooks for subcarrier n.

Figure 11:
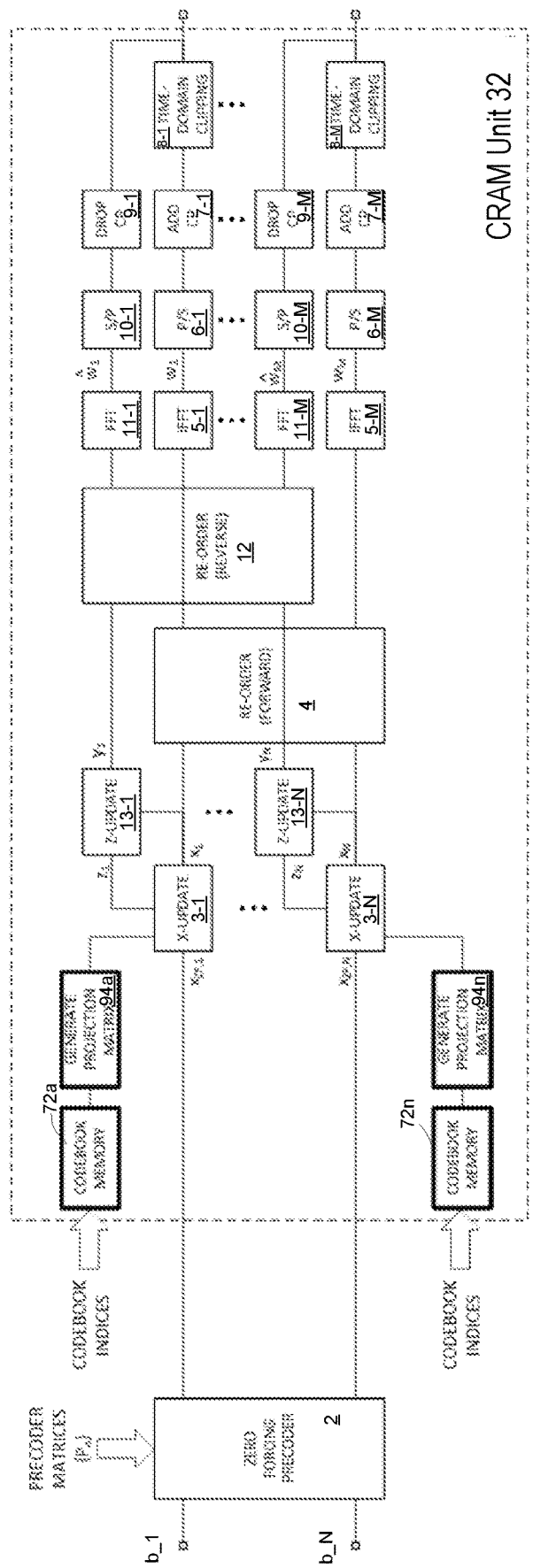
FIG. 11 is a block diagram of another example of a CRAM unit in accordance with one or more embodiments of the disclosure.

Example 3 leads to a throughput requirement reduction since only the codebook indices are transferred over interface as shown in FIG. 11, i.e., codebook indices are transferred instead of transferring coefficients. Some copies of the codebooks may be stored in one or more memories such as memory 72 such that the projection matrix can be generated locally.

In particular, each codebook index can be represented with $\log_2(M)$ bits in total. The CRAM coefficient interface throughput requirement using the codebook embodiment would be of:

$$T_3 = 6 \text{ carriers} \times 100 \frac{PRB}{\text{carrier}} \times 8 \frac{\text{codebook indices}}{PRB} \times$$
$$6 \frac{\text{bits}}{\text{codebook index}} \times 15 \times 10^3 \text{ Hz}$$
$$= 432 \text{ Mbps}$$

This is compared to a throughput requirement of 449.28 Gbps described above, i.e., in one or more embodiments, codebook indices and not coefficients themselves are transferred over interface in CRAM unit 32.

In Example 3 there are two contributions which help reduce the interface throughput requirement, namely, a reduction in the number of entries that are transmitted per PRB as well as a reduction in the number of bits per entry. The throughput reduction factor for this embodiment is expressed as:

$$T_4^{reduction\_factor} = \frac{\frac{M^2 + M}{2}}{K} \cdot \frac{2 \cdot Q_{bits}}{\log_2(M)} = \frac{(M^2 + M) \cdot Q_{bits}}{K \cdot \log_2(M)} \quad (12)$$

Where $Q_{bits}$ is the number of bits that used to quantize both the real and the imaginary parts of the CRAM projection coefficients.

Acquiring the Signal Subspace from the Pre-Coded Solution—Example 4

Figure 12:
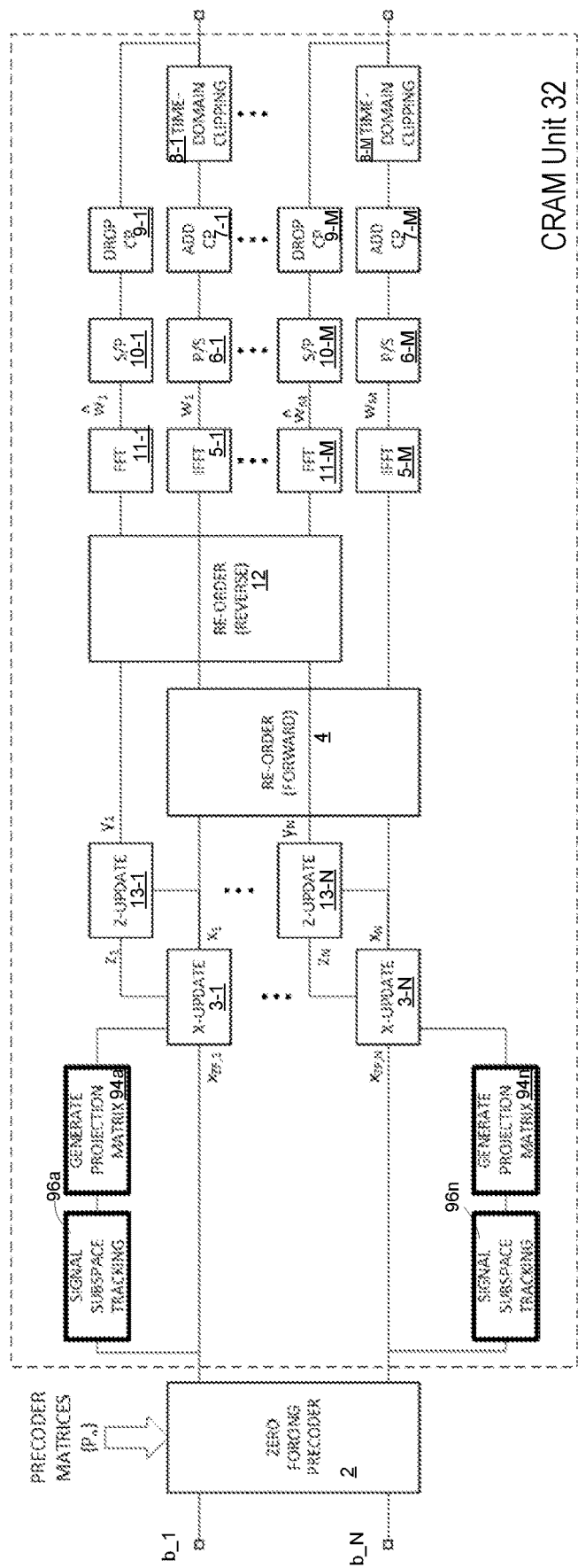
FIG. 12 is a block diagram of yet another example of a CRAM unit in accordance with one or more embodiments of the disclosure

In Example 4 that is illustrated in FIG. 12, the CRAM coefficient interface is eliminated as shown in FIG. 12. The signal subspace is acquired from the pre-coded signal that is provided by the precoder 2 using signal subspace tracking algorithms 96a-96b that are known in the art that may be implemented in CRAM unit 32 and/or processing circuitry 68. In FIG. 12, the blocks with the bold edges correspond to the functions that are added in replacement of the CRAM coefficient interface.

Acquiring the Signal Subspace from the Uplink Channel—Example 5

Figure 13:
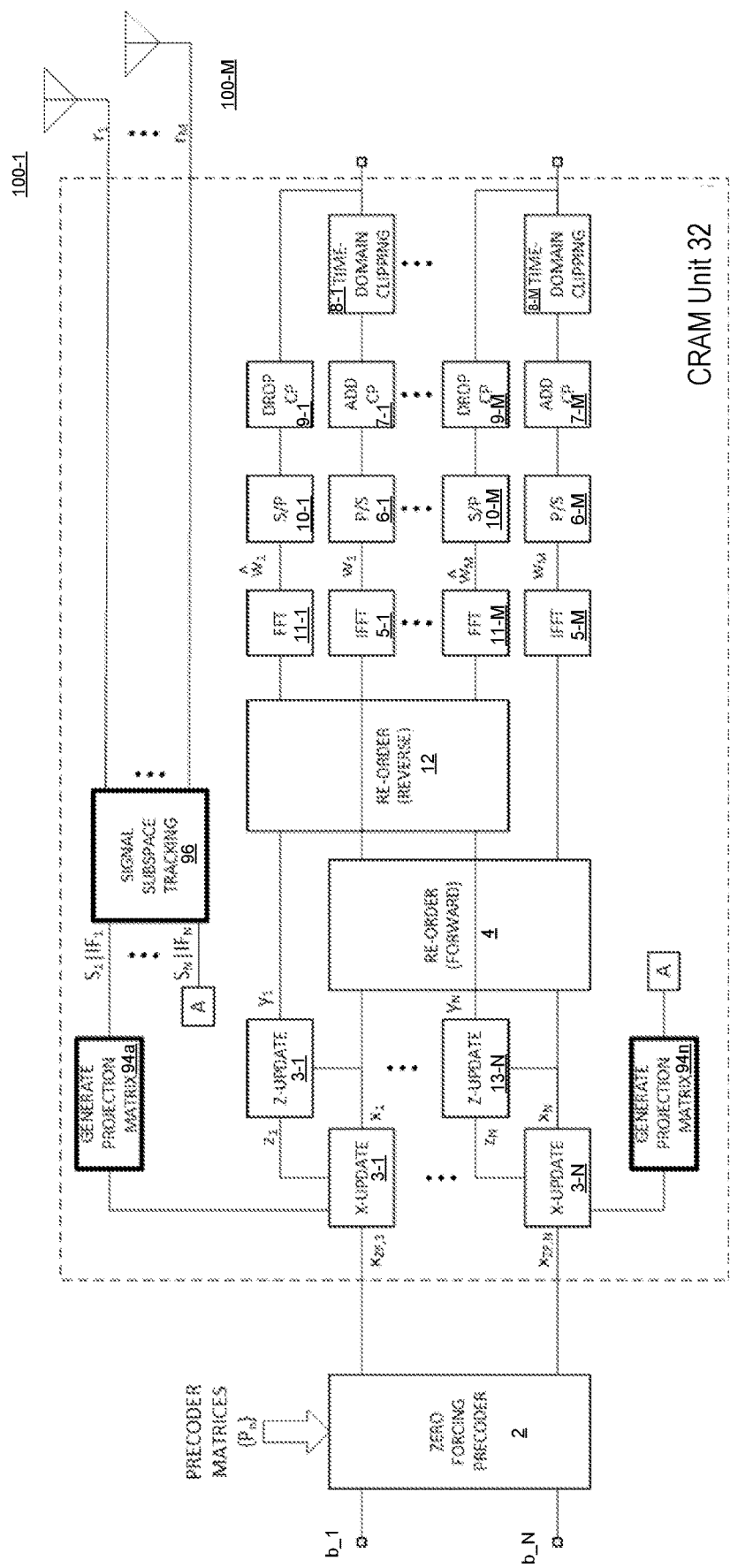
FIG. 13 is a block diagram of yet another example of a CRAM unit in accordance with one or more embodiments of the disclosure.

In Example 5 that is illustrated in FIG. 13, the signal subspace is acquired over the air by tracking the signal subspace in one or more uplink channels using one or more known tracking algorithms implemented by CRAM unit 32 and/or processing circuitry 68, for example. The output of the signal subspace tracking function 96 in FIG. 13 corresponds to the scheduled WD 22's signal subspace $S_n$. The tracking maybe performed based on signals received via antennas 100-1 to 100-M of network node 16. The CRAM projection matrices are then generated by CRAM unit 32 and/or processing circuitry 68 using the last row of equation (6).

In addition, the signal subspace tracking function in FIG. 13 may also track the signal subspace of interfering WD 22s located in adjacent cells to enable RAIT transmissions. In such cases, the signal subspace tracking function also outputs the interfering WD 22's subspace $IF_n$ and the CRAM projection matrices are generated using equation (9). In other words, the signal subspace tracking function 96, in this example, tracks scheduled WD's 22 signal subspace and/or interring WDs 22 signal subspace, i.e., $S_N|IF_N$.

Therefore in one or more embodiments described herein, the CRAM projection matrices are treated as a function of the signal subspace to reduce the CRAM coefficient interface throughput requirement. Multiple beamforming schemes can be supported using this approach such as reciprocity-based beamforming, RAIT as well as codebook-based transmissions. In one or more embodiments, the coefficient interface is eliminated by acquiring the signal subspace of the scheduled WD 22s—and optionally the interferer's subspace from the pre-coded signal(s) that are provided by the precoder 2 or from the air by monitoring the uplink channels.

One or more processes described herein may be implemented in the cloud and/or by host computer 24. However, these RAN functions described herein may be implemented as close to the antenna of network node 16 as possible for latency purposes, i.e., may be collocated with antennas of network node 16.

Figure 14:
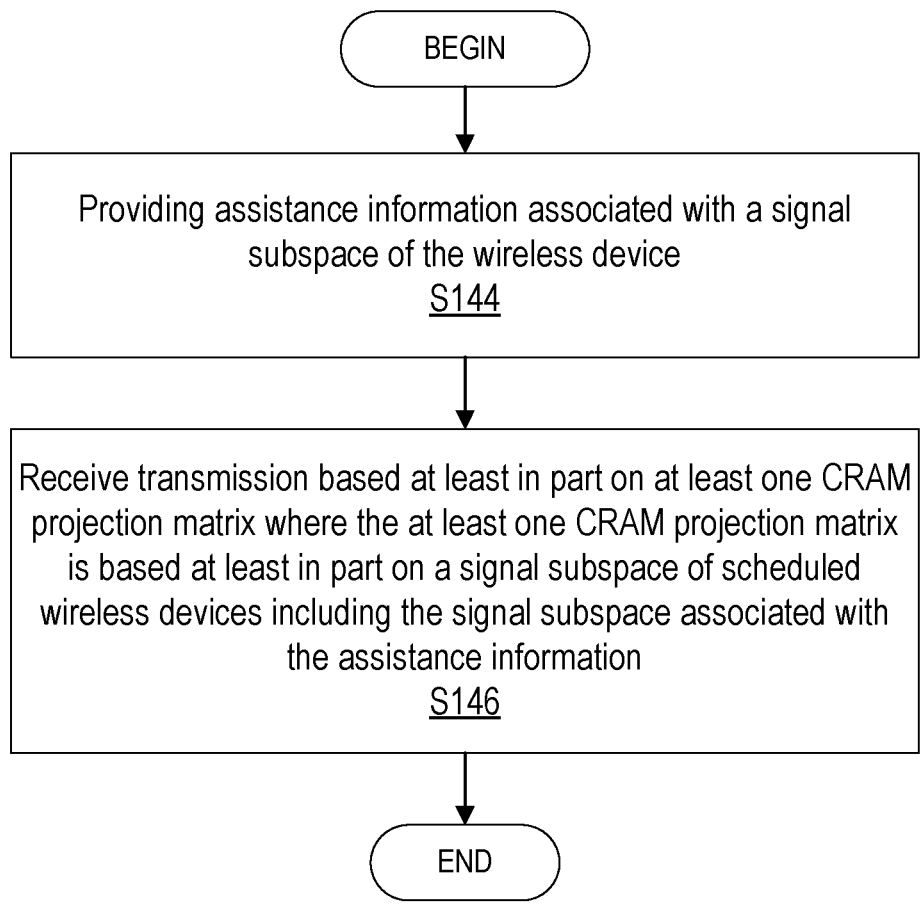
FIG. 14 is a flowchart of an exemplary process in a wireless device in accordance with one or more embodiments of the disclosure.

FIG. 14 is a flowchart of an exemplary process in a wireless device 22 according to some embodiments of the disclosure. One or more Blocks and/or functions performed by wireless device 22 may be performed by one or more elements of wireless device 22 such as by channel estimation unit 34 in processing circuitry 84, processor 86, radio interface 82, etc. In one or more embodiments, wireless device such as via one or more of processing circuitry 84, processor 86 and radio interface 82 is configured to provide (Block S144) assistance information associated with a signal subspace of the wireless device 22, as described herein. In one or more embodiments, the wireless device 22 may estimate the wireless channel using known methods/processes where the assistance information is based at least in part on the estimation. In one or more embodiments, wireless device such as via one or more of processing circuitry 84, processor 86 and radio interface 82 is configured to receive (Block S146) transmission based at least in part on at least one CRAM projection matrix where the at least one CRAM projection matrix is based at least in part on a signal subspace of scheduled wireless devices 22 including the signal subspace associated with the assistance information, as described herein.

According to one or more embodiments, the at least one CRAM projection matrix is based at least in part on a signal subspace of interfering wireless devices 22. According to one or more embodiments, the at least one CRAM projection matrix is based at least in part on at least one precoding codebook entry. According to one or more embodiments, the signal subspace of the scheduled wireless devices 22 corresponds to eigenvectors associated with the channel response of the scheduled wireless devices 22. According to one or more embodiments, the signal subspace of the scheduled wireless devices 22 is an M×K signal subspace where M is a quantity of antennas of the network node 16 and K is a quantity of Multiple-Input Multiple-Output, MIMO, layers. According to one or more embodiments, the transmission is based at least in part on Multiple-Input Multiple-Output, MIMO, precoders where the MIMO precoders being based at least in part on the at least one CRAM projection matrix.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
5G Fifth Generation of cellular communications
CFR Crest Factor Reduction
CP Cyclic Prefix
CRAM Convex Reduction of AMplitude
DPD Digital Pre-Distortion
FFT Fast Fourier Transform
IFFT Inverse Fast Fourier Transform
LTE Long-Term Evolution
MIMO Multiple-Inputs Multiple-Outputs
NR New Radio
OFDM Orthogonal Frequency-Division Duplexing
PA Power Amplifier
PAPR Peak-to-Average Power Ratio
PRB Physical Resource Block
PS Parallel-to-Serial
RAIT Reciprocity Assisted Interference aware Transmission
SERDES Serializer-Deserializer
SP Serial-to-Parallel
SVD Singular Value Decomposition
ZF Zero-Forcing It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node, comprising:
    processing circuitry configured to:
        determine at least one Convex Reduction of Amplitude (CRAM) projection matrix based at least in part on a signal subspace of scheduled wireless devices; and
        cause transmission based at least in part on the at least one CRAM projection matrix.

2. The network node of claim 1, wherein the at least one CRAM projection matrix is based at least in part on a signal subspace of interfering wireless devices.

3. The network node of claim 1, wherein the at least one CRAM projection matrix is based at least in part on at least one precoding codebook entry.

4. The network node of claim 1, wherein the processing circuitry is further configured to determine the signal subspace of the scheduled wireless devices based at least in part by tracking at least one uplink channel.

5. The network node of claim 1, wherein the processing circuitry is further configured to determine the signal subspace of the scheduled wireless devices based at least in part by tracking a pre-coded signal from a precoder.

6. The network node of claim 1, wherein the processing circuitry is further configured to receive an indication of the signal subspace of the scheduled wireless devices in a pre-coded signal from a precoder.

7. The network node of claim 1, wherein the processing circuitry is further configured to receive indications of the signal subspace of the scheduled wireless devices from the scheduled wireless devices.

8. The network node of claim 1, wherein the signal subspace of the scheduled wireless devices corresponds to eigenvectors associated with a channel response of the scheduled wireless devices.

9. The network node of claim 1, wherein the signal subspace of the scheduled wireless devices is an M×K signal subspace, where M is a quantity of antennas of the network node and K is a quantity of Multiple-Input Multiple-Output (MIMO) layers.

10. The network node of claim 1, wherein the processing circuitry is further configured to determine Multiple-Input Multiple-Output (MIMO) precoders based at least in part on the at least one CRAM projection matrix, the transmission being based at least in part on the MIMO precoders.

11. A method implemented in a network node, the method comprising:
    determining at least one Convex Reduction of Amplitude (CRAM) projection matrix based at least in part on a signal subspace of scheduled wireless devices; and
    causing transmission based at least in part on the at least one CRAM projection matrix.

12. The method of claim 11, wherein the at least one CRAM projection matrix is based at least in part on a signal subspace of interfering wireless devices.

13. The method of claim 11, wherein the at least one CRAM projection matrix is based at least in part on at least one precoding codebook entry.

14. The method of claim 11, further comprising determining the signal subspace of the scheduled wireless devices based at least in part by tracking at least one uplink channel.

15. The method of claim 11, further comprising determining the signal subspace of the scheduled wireless devices based at least in part by tracking a pre-coded signal from a precoder.

16. The method of claim 11, further comprising receiving an indication of the signal subspace of the scheduled wireless devices in a pre-coded signal from a precoder.

17. The method of claim 11, further comprising receiving indications of the signal subspace of the scheduled wireless devices from the scheduled wireless devices.

18. The method of claim 11, wherein the signal subspace of the scheduled wireless devices corresponds to eigenvectors associated with a channel response of the scheduled wireless devices.

19. The method of claim 11, wherein the signal subspace of the scheduled wireless devices is an M×K signal subspace, where M is a quantity of antennas of the network node and K is a quantity of Multiple-Input Multiple-Output (MIMO) layers.

20. The method of claim 11, further comprising determining Multiple-Input Multiple-Output (MIMO) precoders based at least in part on the at least one CRAM projection matrix, the transmission being based at least in part on the MIMO precoders.

21. A wireless device, comprising:
    processing circuitry configured to:
        provide assistance information associated with a signal subspace of the wireless device; and
        receive transmission based at least in part on at least one Convex Reduction of Amplitude (CRAM) projection matrix, the at least one CRAM projection matrix being based at least in part on a signal subspace of scheduled wireless devices including the signal subspace associated with the assistance information.

22. The wireless device of claim 21, wherein the at least one CRAM projection matrix is based at least in part on a signal subspace of interfering wireless devices.

23. The wireless device of claim 21, wherein the at least one CRAM projection matrix is based at least in part on at least one precoding codebook entry.

24. The wireless device of claim 21, wherein the signal subspace of the scheduled wireless devices corresponds to eigenvectors associated with a channel response of the scheduled wireless devices.

25. The wireless device of claim 21, wherein the signal subspace of the scheduled wireless devices is an M×K signal subspace, where M is a quantity of antennas of a network node and K is a quantity of Multiple-Input Multiple-Output (MIMO) layers.

26. The wireless device of claim 21, wherein the transmission is based at least in part on Multiple-Input Multiple-Output (MIMO) precoders, the MIMO precoders being based at least in part on the at least one CRAM projection matrix.

27. A method implemented in a wireless device, the method comprising:
providing assistance information associated with a signal subspace of the wireless device; and
receiving transmission based at least in part on at least one Convex Reduction of Amplitude (CRAM) projection matrix, the at least one CRAM projection matrix being based at least in part on a signal subspace of scheduled wireless devices including the signal subspace associated with the assistance information.

28. The method of claim 27, wherein the at least one CRAM projection matrix is based at least in part on a signal subspace of interfering wireless devices.

29. The method of claim 27, wherein the at least one CRAM projection matrix is based at least in part on at least one precoding codebook entry.

30. The method of claim 27, wherein the signal subspace of the scheduled wireless devices corresponds to eigenvectors associated with a channel response of the scheduled wireless devices.

31. The method of claim 27, wherein the signal subspace of the scheduled wireless devices is an M×K signal subspace, where M is a quantity of antennas of a network node and K is a quantity of Multiple-Input Multiple-Output (MIMO) layers.

32. The method of claim 27, wherein the transmission is based at least in part on Multiple-Input Multiple-Output (MIMO) precoders, the MIMO precoders being based at least in part on the at least one CRAM projection matrix.

* * * * *